(Model.)
H. E. BOYD.
COUPLING FOR TUBING.
No. 245,438. Patented Aug. 9, 1881.
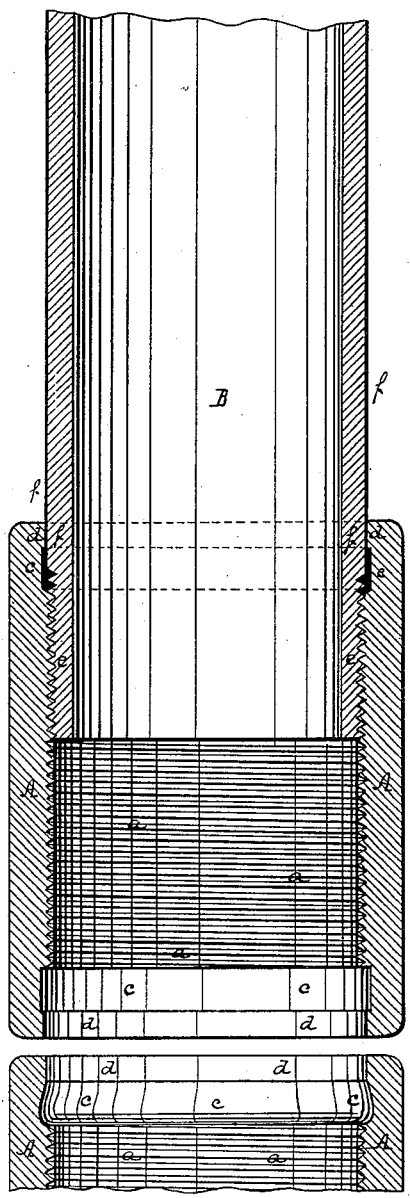

UNITED STATES PATENT OFFICE.

HENRY E. BOYD, OF McKEESPORT, PENNSYLVANIA.

COUPLING FOR TUBING.

SPECIFICATION forming part of Letters Patent No. 245,438, dated August 9, 1881.

Application filed February 21, 1881. (Model.)

*To all whom it may concern:*

Be it known that I, HENRY E. BOYD, of McKeesport, in the county of Allegheny and State of Pennsylvania, have invented a new and useful Improvement in Couplings for Tubing; and I do hereby declare the following to be a full, clear, and exact description thereof, reference being had to the accompanying drawings, forming a part of this specification.

Figure 1 represents a longitudinal central section of my improved coupling, a section of pipe being secured in one end; and Fig. 2 is a sectional view of part of the coupling, showing another form of recess.

Like letters of reference indicate like parts in each.

My invention relates to the couplings used for connecting the different lengths of wrought-metal pipe, such as the pipe or tubing used in oil or other Artesian wells, and for various other purposes. These couplings are formed with an internal screw-thread, and the lengths of tubing are provided with a corresponding external screw-thread at each end, the different lengths of pipe being screwed into these couplings or unions to make a continuous line of pipe.

My invention has special reference to the couplings which are provided with a plain portion at either end of larger diameter than the screw-threads, which portion serves to direct the threaded end of the pipe into the threaded portion of the coupling, and when the pipe is screwed to place extends up along the body of the straight pipe beyond the threaded portion, to brace it and take any strain off the threaded portion of the pipe. Experience has proved that, on account of irregularities on the surface of the pipe, such as the weld-mark, and because the pipe is not always perfectly cylindrical, this plain portion is necessarily made larger than the full diameter of the pipe, as the pipe would otherwise catch in this recess or expand the coupling so as to loosen the joints of the threaded parts.

My invention consists in combining with tubing the body or unthreaded portion whereof is of the same diameter throughout a coupling provided with a plain portion beyond the screw-threads and a narrow internal ring around its mouth, said ring being adapted to clasp the unthreaded portion of the tube and expand or wear off to permit the passage of the unthreaded portion within it, so as to form a strong support for the tubing at the end of the coupling.

To enable others skilled in the art to make and use my invention, I will describe its construction and manner of use.

In the drawings, A represents the coupling, and B a length of pipe or tubing screwed thereon. The coupling is threaded on the interior, as at *a*, and at either end is the plain or unthreaded portion *c*, which is slightly larger in diameter than the screw-thread *a*. Around the outer edge or mouth of the plain portion *c* is the narrow annular ring or lip *d*, this lip projecting inward from the portion *c*, and its inner surface being slightly smaller in diameter than the outer surface of the unthreaded portion or body of the pipe, so as to fit closely around or bind slightly upon the pipe when screwed to place. The straight unthreaded portion or body *f* of the pipe is made of the same external diameter throughout, being what is termed a "straight pipe," and the pipe is provided with a screw-thread, *e*, at each end, corresponding to the screw-thread *a* of the coupling. In screwing the pipe to place the screw-thread *e* fits through the ring *d* into the plain portion *c*, which directs it into the screw-thread *a* of the coupling. The pipe is then screwed in until the unthreaded portion or body *f* enters within the ring or lip *d*, and this lip binds or clasps the body of the pipe tightly and serves to form a tight joint between the plain surface of the pipe and the end of the coupling, the ring either expanding to admit of the entrance of the body *f* within it or its surface wearing off, so that the pipe-body can pass through, and this ring supports the pipe and takes any side strain off of the weakened threaded portion.

Where there are any enlargements on the unthreaded portion of the pipe, as the weld-mark, or where the pipe is slightly larger than the ring *d* or is not perfectly cylindrical, these enlargements or the body of the pipe generally wear off the inner surface of the narrow ring *d*, so that the pipe can pass within it, and, having cut or worn through this ring, the body of the pipe will find full space for its reception in the plain portion below, so that the pipe can be screwed up until its entire threaded portion *e* fits within the threaded portion *a* of the coupling and the body of the pipe fits within the plain portion c and is clasped by the ring d of the coupling. As the surface of the ring d is very narrow, very little extra force is necessary to cut or wear off its surface, and thus permit the pipe-body to enter within it. If, however, the body of the pipe does not wear off the surface of the ring d of the coupling sufficiently, it will expand the ring enough to permit of the entrance of the pipe-body within the ring. As the ring is narrow, a slight expansion only of the ring is necessary, and when once within the ring the plain portion c is large enough to admit the pipe-body, and no further expansion of the coupling is necessary to screw the pipe to place. The passage of the unthreaded portion or body of the pipe through the ring will only expand the mouth or plain portion of the coupling, and will in no way cause the loosening of the threaded joint below.

In some cases I form the plain portion c below the ring, as shown in Fig. 2, the plain portion gradually receding from the mouth-ring d, so that it is deepest and the coupling thinnest just above the screw-thread a, so that upon the passage of the unthreaded pipe through the ring d, if the coupling expands, it will spring in this thinned plain portion to admit the pipe, and thus prevent the loosening of the threaded joint below. By the employment of this narrow ring in the mouth of the plain portion of the coupling it is thus enabled to permit the passage of the body or unthreaded portion of the pipe within it, so that the pipe can be screwed to place, and yet to clasp the pipe-body tightly above the threaded joint and support it against lateral strain without in any way impairing the joint formed by the threaded portions of the pipe and coupling.

I am aware of Letters Patent No. 191,768, granted to George Matheson, June 12, 1877, in which a flaring or bell-mouthed ring at the end of the coupling, and of larger diameter than the body of the pipe, is adapted to butt or wedge against an enlarged or upset portion of the pipe, but not to expand or wear off to permit the entrance of the pipe within it, and hence do not claim any such coupling; but

What I claim as my invention, and desire to secure by Letters Patent, is—

In combination with tubing the body or unthreaded portion whereof is of the same diameter throughout, a coupling provided with a plain portion, c, beyond the screw-threads and a narrow internal ring, d, around its mouth, said ring being adapted to clasp the unthreaded portion of the tube and expand or wear off to permit the passage of the unthreaded portion within it, substantially as and for the purposes set forth.

In testimony whereof I, the said HENRY E. BOYD, have hereunto set my hand.

HENRY E. BOYD.

Witnesses:
LEWIS HANEY,
A. E. TRICT.